US012020697B2

(12) United States Patent
Wintrode

(10) Patent No.: US 12,020,697 B2
(45) Date of Patent: Jun. 25, 2024

(54) SYSTEMS AND METHODS FOR FAST FILTERING OF AUDIO KEYWORD SEARCH

(71) Applicant: Raytheon Applied Signal Technology, Inc., Sunnyvale, CA (US)

(72) Inventor: Jonathan C. Wintrode, Annapolis, MD (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 119 days.

(21) Appl. No.: 16/929,383

(22) Filed: Jul. 15, 2020

(65) Prior Publication Data

US 2022/0020361 A1    Jan. 20, 2022

(51) Int. Cl.
| | |
|---|---|
| *G10L 15/197* | (2013.01) |
| *G06F 18/2415* | (2023.01) |
| *G06N 20/00* | (2019.01) |
| *G10L 15/14* | (2006.01) |
| *G10L 15/16* | (2006.01) |

(52) U.S. Cl.
CPC ...... *G10L 15/197* (2013.01); *G06F 18/24155* (2023.01); *G06N 20/00* (2019.01); *G10L 15/144* (2013.01); *G10L 15/16* (2013.01)

(58) Field of Classification Search
CPC ..... G10L 15/197; G10L 15/144; G10L 15/16; G06N 20/00; G06K 9/6278
See application file for complete search history.

(56) References Cited

U.S. PATENT DOCUMENTS

| | | |
|---|---|---|
| 6,542,869 B1 | 4/2003 | Foote |
| 7,337,115 B2 | 2/2008 | Liu et al. |
| 7,437,284 B1 | 10/2008 | Margulies |
| 7,801,910 B2 | 9/2010 | Houh et al. |

(Continued)

FOREIGN PATENT DOCUMENTS

| | | | | |
|---|---|---|---|---|
| CN | 104036012 A | * | 9/2014 | ....... G06F 17/30247 |
| WO | 2016189307 A1 | | 12/2016 | |

OTHER PUBLICATIONS

Bisandu et al., "Clustering news articles using efficient similarity measure and N-grams" Int. J. Knowledge Engineering and Data Mining, vol. 5, No. 4, 2018, pp. 333-348 (Year: 2018).*

(Continued)

*Primary Examiner* — Douglas Godbold
*Assistant Examiner* — Edward Tracy, Jr.
(74) *Attorney, Agent, or Firm* — Schwegman Lundberg & Woessner, P.A.

(57) ABSTRACT

An audio keyword searcher arranged to identify a voice segment of a received audio signal; identify, by an automatic speech recognition engine, one or more phonemes included in the voice segment; output, from the automatic speech recognition engine, the one or more phonemes to a keyword filter to detect whether the voice segment includes any of the one or more first keywords of the first keyword list and, if detected, output the one or more phonemes included in the voice segment to a decoder but, if not detected, not output the one or more phonemes included in the voice segment to the decoder. If the one or more phonemes are output to the decoder: generate a word lattice associated with the voice segment; search the word lattice for one or more second keywords, and determine whether the voice segment includes the one or more second keywords.

20 Claims, 10 Drawing Sheets

(56) References Cited

U.S. PATENT DOCUMENTS

| | | |
|---|---|---|
| 10,388,272 B1 | 8/2019 | Thomson et al. |
| 10,402,500 B2 | 9/2019 | Chochowski et al. |
| 10,573,312 B1 | 2/2020 | Thomson et al. |
| 10,964,329 B2 | 3/2021 | Ghaemmaghami et al. |
| 11,176,934 B1 | 11/2021 | Venkatesh Raman et al. |
| 2001/0012998 A1 | 8/2001 | Jouet et al. |
| 2004/0083104 A1 | 4/2004 | Liu et al. |
| 2006/0206310 A1 | 9/2006 | Ravikumar et al. |
| 2007/0112837 A1 | 5/2007 | Houh et al. |
| 2010/0125448 A1 | 5/2010 | Goswami |
| 2010/0191530 A1 | 7/2010 | Nakano et al. |
| 2012/0017146 A1 | 1/2012 | Travieso et al. |
| 2012/0323573 A1 | 12/2012 | Yoon et al. |
| 2013/0311190 A1 | 11/2013 | Reiner |
| 2015/0095026 A1* | 4/2015 | Bisani .................. H04R 3/005 704/232 |
| 2015/0194147 A1 | 7/2015 | Yoon et al. |
| 2015/0228279 A1 | 8/2015 | Biadsy et al. |
| 2015/0371635 A1* | 12/2015 | Kintzley ................ G10L 15/22 704/251 |
| 2016/0042739 A1 | 2/2016 | Cumani et al. |
| 2016/0240188 A1 | 8/2016 | Seto |
| 2016/0267904 A1 | 9/2016 | Biadsy et al. |
| 2016/0284347 A1* | 9/2016 | Sainath .................. G10L 15/16 |
| 2017/0011735 A1 | 1/2017 | Kim et al. |
| 2017/0061002 A1 | 3/2017 | Roblek et al. |
| 2017/0092266 A1 | 3/2017 | Wasserblat et al. |
| 2017/0294192 A1 | 10/2017 | Bradley et al. |
| 2017/0308613 A1* | 10/2017 | Zhu .................... G06F 16/9535 |
| 2017/0365251 A1 | 12/2017 | Park et al. |
| 2018/0012594 A1 | 1/2018 | Behzadi et al. |
| 2018/0053502 A1 | 2/2018 | Biadsy et al. |
| 2018/0006865 A1 | 3/2018 | Trawick et al. |
| 2018/0061412 A1 | 3/2018 | Cho et al. |
| 2018/0174600 A1 | 6/2018 | Chaudhuri et al. |
| 2018/0342239 A1 | 11/2018 | Baughman et al. |
| 2018/0357998 A1 | 12/2018 | Georges et al. |
| 2018/0374476 A1 | 12/2018 | Lee et al. |
| 2019/0108257 A1 | 4/2019 | Lefebure et al. |
| 2019/0138539 A1 | 5/2019 | Moreno Mengibar et al. |
| 2019/0237096 A1* | 8/2019 | Trella .................... G10L 25/84 |
| 2019/0304470 A1 | 10/2019 | Ghaemmaghami et al. |
| 2019/0371318 A1 | 12/2019 | Shukla |
| 2019/0385589 A1 | 12/2019 | Muramatsu |
| 2020/0019492 A1* | 1/2020 | Fei ...................... G06K 9/6218 |
| 2020/0027444 A1 | 1/2020 | Prabhavalkar et al. |
| 2020/0035739 A1 | 1/2020 | Saito et al. |
| 2020/0074992 A1 | 3/2020 | Xiong et al. |
| 2020/0111476 A1 | 4/2020 | Kamano et al. |
| 2020/0175961 A1 | 6/2020 | Thomson et al. |
| 2020/0021949 A1 | 7/2020 | Apsingekar et al. |
| 2020/0243077 A1* | 7/2020 | Rao ...................... G10L 15/12 |
| 2020/0243094 A1 | 7/2020 | Thomson et al. |
| 2020/0293875 A1 | 9/2020 | Zhang et al. |
| 2020/0357391 A1 | 11/2020 | Ghoshal et al. |
| 2020/0038021 A1 | 12/2020 | Kannan et al. |
| 2020/0380074 A1* | 12/2020 | Li ........................ G06Q 50/01 |
| 2020/0387677 A1 | 12/2020 | Kim et al. |
| 2021/0055778 A1* | 2/2021 | Myer .................... G06F 1/3231 |
| 2021/0232776 A1 | 7/2021 | Kim et al. |
| 2021/0248421 A1* | 8/2021 | Gao ...................... G06K 9/627 |
| 2021/0342785 A1* | 11/2021 | Mann ............. G06Q 10/063114 |

OTHER PUBLICATIONS

He et al., "Streaming End-to-End Speech Recognition for Mobile Devices," ICASSP 2019—2019 IEEE International Conference on Acoustics, Speech and Signal Processing (ICASSP), May 12-17, 2019.

Chen et al., "Query-by-Example Keyword Spotting Using Long Short-Term Memory Networks," IEEE International Conference on Acoustics, Speech and Signal Processing (ICASSP), Apr. 19-24, 2015.

Zhang, et al., "Unsupervised Spoken Keyword Spotting Via Segmental DTW on Gaussian Posteriorgrams," Proceedings of the Automatic Speech Recognition & Understanding (ASRU) Workshop, IEEE, 2009, 398-403.

Miller, et al., "Rapid and Accurate Spoken Term Detection," Proceedings of Interspeech, ISCA, 2007, pp. 314-317.

Snyder et al., "X-vectors: Robust DNN embeddings for speaker recognition," in Proc. IEEE ICASSP, 2018.

Dehak et al., "Front-end factor analysis for speaker verification," IEEE Transactions on Audio, Speech, and Language Processing, vol. 19, No. 4, pp. 788-798, 2011.

Kinnunen, et al., "Real-time speaker identification and verification." IEEE Transactions on Audio, Speech, and Language Processing, vol. 14, No. 1, 277-288, 2006.

Kinnunen et al., "A speaker pruning algorithm for real-time speaker identification," in International Conference on Audio-and Video-Based Biometric Person Authentication. Springer, 639-646, 2003.

Sarkar et al., "Fast Approach to Speaker Identification for Large Population using MLLR and Sufficient Statistics," in 2010 National Conference on Communications (NCC) IEEE, 1-5, 2010.

Schmidt et al., "Large-scale Speaker Identification," in Proc. of International Conference on Acoustics, Speech and Signal Processing (ICASSP) IEEE, 1669-1673, 2014.

Zhu et al., "Self-attentive Speaker Embeddings for Text-Independent Speaker Verification," Interspeech, 2018.

David Snyder, "SRE16 Xvector Model," http://kaldi-asr.org/models/m3, 2017, Accessed: Oct. 10, 2018.

International Search Report and Written Opinion for International Application No. PCT/US2020/066298 dated Mar. 26, 2021.

* cited by examiner

SYSTEMS AND METHODS FOR FAST FILTERING OF AUDIO KEYWORD SEARCH

TECHNICAL FIELD

This application relates generally to automatic speech recognition and, more particularly, to audio keyword search techniques.

BACKGROUND

Automatic speech recognition (ASR) enables the recognition and translation of spoken language into text by a computer. ASRs are often used as voice user interfaces to input data or commands into a computer system via a user's voice. As ASR technology has evolved and the cost of data storage has decreased, the amount of audio data accessible to computer systems has substantially increased, resulting in the development of audio keyword search systems that enable users to more readily access relevant audio voice or speech information.

The current state-of-the art in audio keyword search requires transcribing all words in the recording by an ASR and then identifying the location of key terms. Because an ASR typically implements a computationally intensive multi-stage process, certain devices such as mobile computing devices having relatively limited computer processing power are not able to practically implement a keyword search system without substantially hindering the performance of such devices. In a current keyword search process or pipeline, the ASR can dominate the consumed processing demand by consuming up to 93% of the demand.

Recently, the National Institute of Standards and Technology (NIST) has promoted an OpenSAT Series to evaluate ASR, speech activity detection (SAD), and Keyword Search (KWS) in support of public safety communications (PSC). A simulated PSC dataset has been made publicly available to enable the assessment of ASR, SAD, and KWS systems under simulated environmental conditions typically experienced by public safety personnel in the field.

Existing non-hardware based optimization of audio keyword search falls into two categories, neural network computation acceleration or customized search-specific modeling frameworks. The latter set of approaches can be broken down into word-recognition based approaches and query-by-example approaches. One existing approach uses query-by-example keyword spotting using Long Short-Term Memory Networks (LSTM) which involves using a neural network approach to model specific words. Another approach uses unsupervised spoken keyword spotting via segmental dynamic time warping (DTW) on Gaussian posteriorgrams which requires posteriorgram inputs and model specific keywords.

Unfortunately, none of the existing audio keyword search techniques can be practically and efficiently implemented on computing platforms with relatively limited processing power.

SUMMARY

The application, in various implementations, addresses deficiencies associated with the efficiency of audio keyword search techniques.

This application describes an exemplary audio keyword search (KWS) system configured to reduce the computation cost of finding spoken words in audio recordings. The inventive systems, methods and devices described herein learn a function (i.e., a classifier) on posteriorgrams of a voice segment which may be improved by user feedback. Users can mark short (e.g., 1 to 10 seconds) of audio that contain occurrences of a fixed set of keywords. The systems, methods, and devices described herein process the audio and build a classifier function using standard machine learning (ML) techniques. The systems, methods, and devices insert the classifier into any audio KWS pipeline and reject audio segments that do not contain at least one keyword of the set of keywords.

The present approaches build a binary (yes/no) model to detect any of a fixed set of keywords. Existing approaches attempt to match single keywords by example, resulting either in many models or a simpler comparison function. By contrast, the inventive systems, methods and devices herein learn a single function for a set of keywords. Additionally, the present implementation can be applied to a standard output of existing ASR acoustic models. The present keyword search classifier and/or filter can be retrofitted into existing ASR systems without the need to modify any system internals. Hence, the inventive system, methods, and devices can be applied to speed up third party ASR systems.

Because an ASR implements a computationally intensive multi-stage process, the approaches described herein speed up the execution time by identifying audio recordings for which the stages of the ASR process may be omitted. The system, methods, and devices described herein include two top-level components, a learning module and a runtime KWS module. In some implementations, there are two sub-components: an ASR engine and a keyword classifier. The ASR engine may be provided by a third party.

In some implementations, the learning module accepts short (e.g., 1-10 second duration) audio segments, a list of keywords of interest, and labels for each segment indicating if the audio segment contains any of a target set of keywords. The learning module extracts posteriorgram features for each segment using an ASR engine and then applies one of two types or categories of ML techniques to learn the parameters for the keyword classifier. A runtime keyword search module uses the keyword classifier learned by the learning module to speed up the overall KWS module pipeline. Certain inventive approaches described herein build a binary (yes/no) model to detect a fixed set of keywords.

In one aspect, an audio keyword search system includes a voice activity detector arranged to identify a voice segment of a received audio signal. The system also includes an automatic speech recognizer having a first automatic speech recognition engine arranged to identify one or more phonemes included in the voice segment and output the one or more phonemes to a keyword filter and a decoder arranged to, if the one or more phonemes are outputted by the keyword filter, receive the one or more phonemes included in the voice segment and generate a word lattice associated with the voice segment. The system further includes a keyword search module having a learning module arranged: i) receive a plurality of training speech segments, ii) receive segment labels associated with the plurality of training speech segments, iii) receive a first keyword list including one or more first keywords, and iv) execute a second automatic speech recognition engine to extract one or more posteriorgram features associated with the plurality of training speech segments. The keyword search module also includes a keyword classifier arranged to execute a machine learning technique to determine a filter function based on the first keyword list and the one or more posteriorgram features.

The keyword search module further includes the keyword filter which may be arranged to execute the filter function to detect whether the voice segment includes any of the one or more first keywords of the first keyword list and, if detected, output the one or more phonemes included in the voice segment to the decoder but, if not detected, not output the one or more phonemes included in the voice segment to the decoder. The system also includes a word lattice search engine arranged to: i) receive the word lattice associated with the voice segment if generated by the decoder, ii) search the word lattice for one or more second keywords in a second keyword list, and iii) determine whether the voice segment includes the one or more second keywords.

The machine learning technique may include a bag of phone N-grams technique and/or a direct classification technique. The bag of phone N-grams technique may include a cosine similarity classification technique. The direct classification technique may include a Naïve Bayes classification technique. The filter function may include one or more filter parameters learned from the machine learning technique. A portion of the one or more first keywords of the first keyword list may include the one or more second keywords of the second keyword list. The first automatic search recognition engine may be the same as the second automatic search recognition engine. The first automatic search recognition engine may include a deep neural network acoustic model. The decoder may include a finite state transducer (FST) decoder. The decoder may implement a Hidden Markov Model (HMM) and/or recursive DNN.

In another aspect, a method for performing an audio keyword search includes: identifying a voice segment of a received audio signal; identifying, by a first automatic speech recognition engine, one or more phonemes included in the voice segment; outputting, from the first automatic speech recognition engine, the one or more phonemes to a keyword filter; receiving a plurality of training speech segments, segment labels associated with the plurality of training speech segments, and a first keyword list including one or more first keywords; extracting, by a second automatic speech recognition engine, one or more posteriorgram features associated with the plurality of training speech segments; determining, by a machine learning technique, a filter function based on the first keyword list and the one or more posteriorgram features; and executing the filter function to detect whether the voice segment includes any of the one or more first keywords of the first keyword list and, if detected, outputting the one or more phonemes included in the voice segment to a decoder but, if not detected, not outputting the one or more phonemes included in the voice segment to the decoder.

If the one or more phonemes in the voice segment are output to the decoder: generating, by the decoder, a word lattice associated with the voice segment; searching the word lattice for one or more second keywords in a second keyword list, and determining whether the voice segment includes the one or more second keywords.

In a further aspect, a mobile computing device includes a receiver arranged to receive a communications signal and extract from the communications signal a received audio signal. The devise includes a voice activity detector arranged to identify a voice segment of the received audio signal. The device also includes an automatic speech recognizer having a first automatic speech recognition engine arranged to identify one or more phonemes included in the voice segment and output the one or more phonemes to a keyword filter and a decoder arranged to, if the one or more phonemes are outputted by the keyword filter, receive the one or more phonemes included in the voice segment and generate a word lattice associated with the voice segment.

The device also includes a keyword search module having a learning module arranged: i) receive a plurality of training speech segments, ii) receive segment labels associated with the plurality of training speech segments, iii) receive a first keyword list including one or more first keywords, and iv) execute a second automatic speech recognition engine to extract one or more posteriorgram features associated with the plurality of training speech segments. The keyword search module also includes a keyword classifier arranged to execute a machine learning technique to determine a filter function based on the first keyword list and the one or more posteriorgram features.

The keyword search module also includes the keyword filter which may be arranged to execute the filter function to detect whether the voice segment includes any of the one or more first keywords of the first keyword list and, if detected, output the one or more phonemes included in the voice segment to the decoder but, if not detected, not output the one or more phonemes included in the voice segment to the decoder. The device further includes a word lattice search engine arranged to: i) receive the word lattice associated with the voice segment if outputted by the decoder, ii) search the word lattice for one or more second keywords in a second keyword list, and iii) determine whether the voice segment includes the one or more second keywords.

Any two or more of the features described in this specification, including in this summary section, may be combined to form implementations not specifically described in this specification. Furthermore, while this specification may refer to examples of systems and methods related to keyword search associated with PSC, the implementations and methods herein equally apply to any ASR system employing KWS techniques.

The details of one or more implementations are set forth in the accompanying drawings and the following description. Other features and advantages will be apparent from the description and drawings, and from the claims.

DETAILED DESCRIPTION

The application, in various aspects, addresses deficiencies associated with conventional audio keyword search systems. The application includes exemplary systems, methods, devices for keyword searching configured to speed up the execution time by identifying audio recordings for which the computationally expensive stages of the ASR process may be omitted. In this way, substantially less processing power is used in the KWS pipeline to perform keyword searching. This, in turn, enables a KWS system and/or application to run more efficiently on platforms having relatively lower processing capability such as, for example, a mobile computing device.

Figure 1:
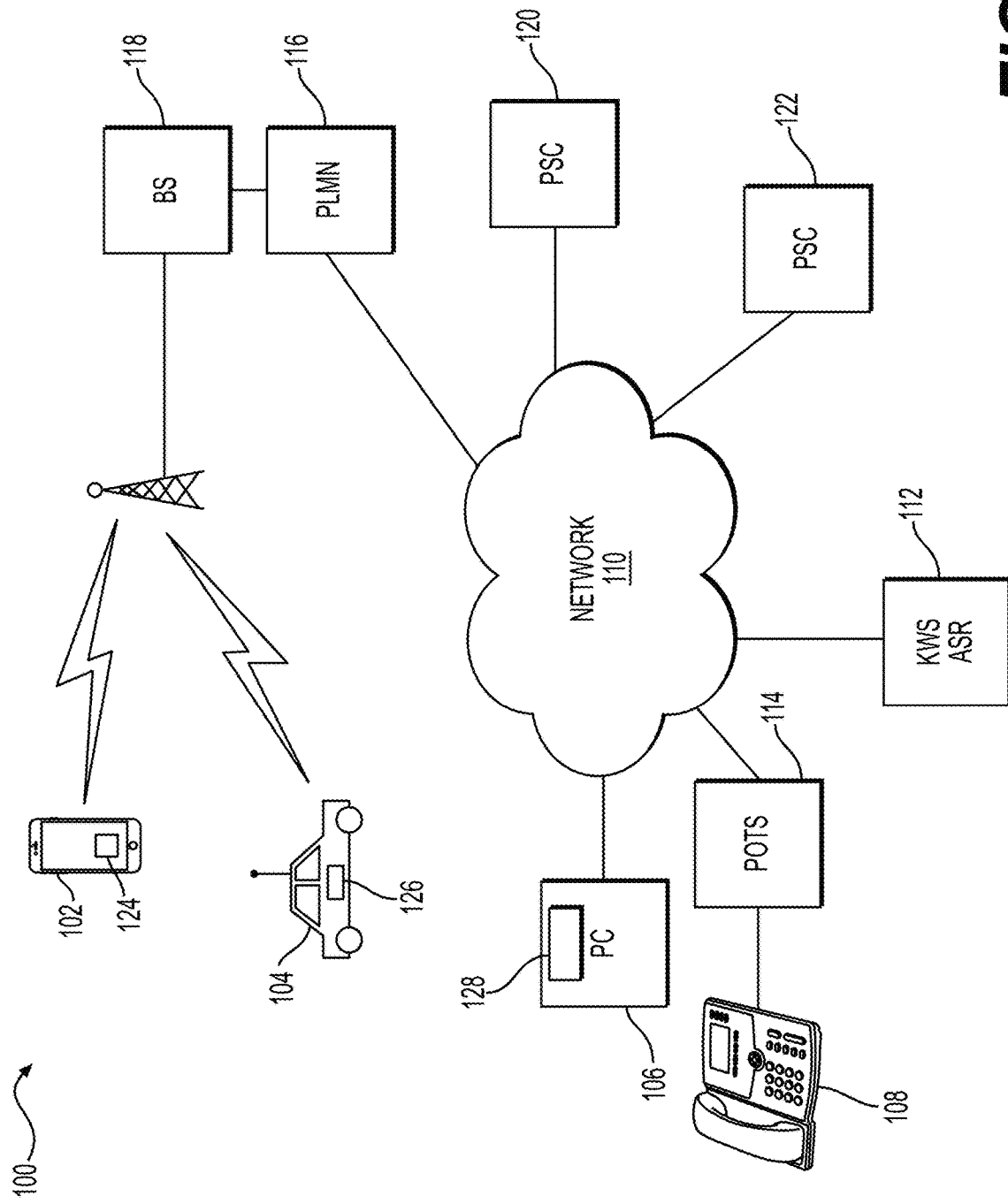
FIG. 1 is an illustration of a public safety communication network.

FIG. 1 is an illustration of a public safety communication (PSC) system 100 including various end user devices such as mobile computing device 102, vehicle 104, computer 106, and telephone 108. Mobile computing device 102 may include a wireless communications devices such as, without limitation, a cellular telephone, computing tablet, portable computer, and so on. Devices 102, 104, and 106 may include a KWS application and/or module 124, 126, and 128 respectively. PSC system 100 may also include a KWS/ASR server 112, PSC server 120, and PSC server 122. Various components of PSC system 100 may communicate via network 110 which may include the Internet, a local area network, a Wifi or 802.11 network, a private network, a wireless network, and/or satellite network. Wireless communications devices 102 and 104 may communicate with other devices, servers, and/or entities connected to network 110 via public land mobile network (PLMN) 116 and base station 118. PLMN 116 may include a CDMA, 802.11, TDMA, 3G, 4G, 5G, GSM, and/or a long term evolution (LTE) network, and the like. While FIG. 1 illustrates an exemplary PSC system 100, it should be understood by one or ordinary skill that a KWS application and/or module 124, 126, 128 and/or KWS/ASR server 112 may operate within any communications network and/or environment.

As will be discussed in detail with respect to FIGS. 3 and 4 later herein, KWS modules 124, 126, and 128 enable a user of device 102, 104 and 106 respectively to input voice information and/or commands via a user interface of the devices 102, 104, and 106 that can then be processed into recognized text and/or commands by modules 124, 126, and 128. In addition to providing automatic speech recognition, modules 102, 104, and 106 provide keyword search capabilities that enable rapid and efficient identification of, for example, highly relevant and high priority information and/or commands. For example, if a user of device 102 is a firefighter on scene at a chemical spill, module 124, using its keyword search functions, may detect when the firefighter says "chemical spill" and automatically send a request for a hazmat team to PSC server 122 and 120, which may be a server run by the state or local public safety authorities. In instances where a device such as telephone 108 is connected to a plain old telephone service (POTS) 114, a remote KWS/ASR server 112 may provide keyword search features to a user of telephone 108 during a call.

Figure 2:
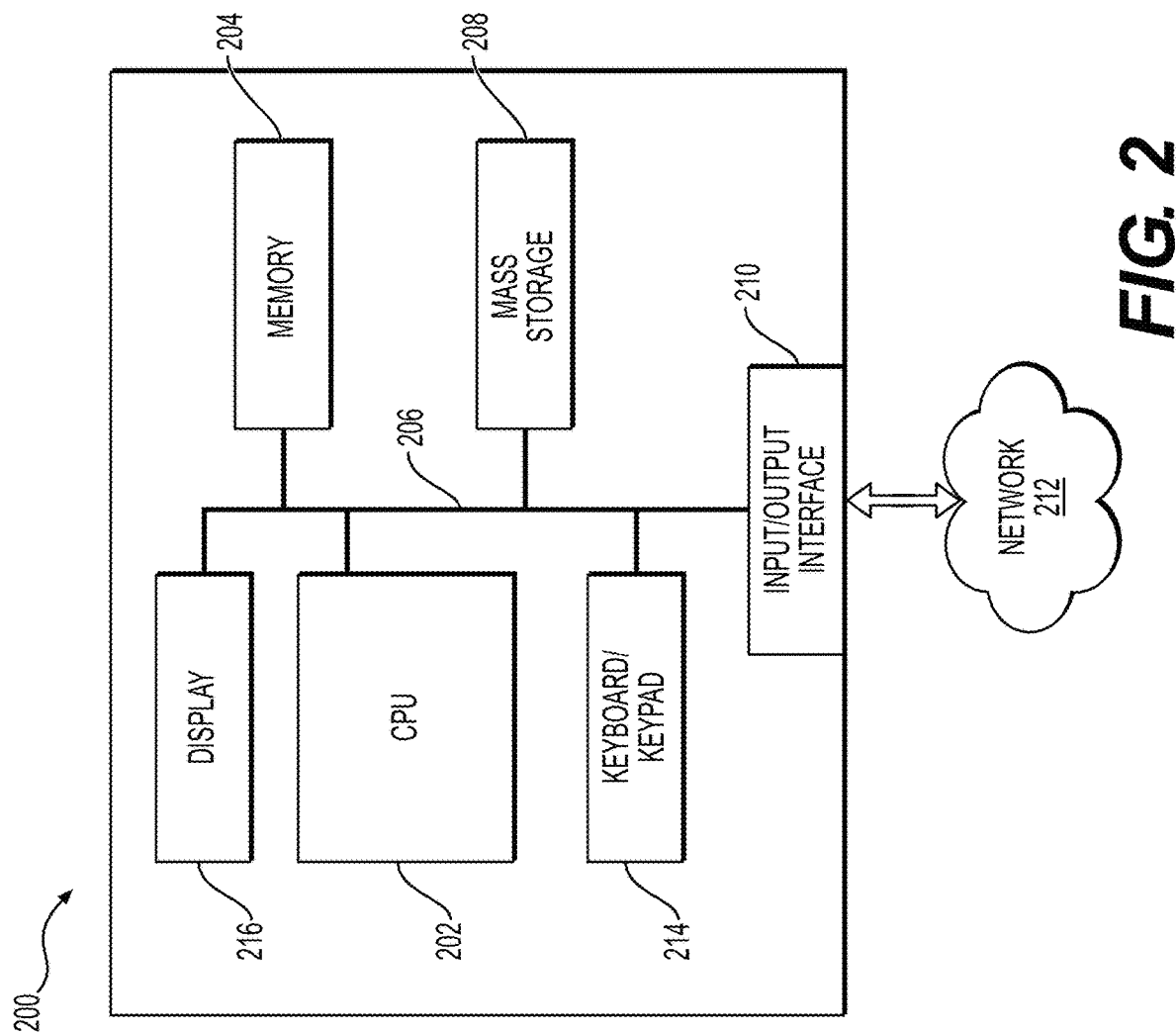
FIG. 2 is block diagram of a computer system arranged to perform processing associated with a keyword search system.

FIG. 2 is block diagram of a computer system 200 arranged to perform processing associated with a keyword search system such as, for example, modules 124, 126, and 128, server 112, systems 300 and 400, which are discussed in detail later herein. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, solid state drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid state memories, for storing data and instructions for use by the CPU 202. At least one component of the mass storage system 208, preferably in the form of a non-volatile disk drive, solid state, or tape drive, stores the database used for processing image data and/or running artificial intelligence (AI) engines and neural networks of an ASR and/or KWS system. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a module 124, 126, and 128 and/or server 112 according to FIG. 1, the data interface 210 may provide a relatively high-speed link to a network 212 and/or network 110, such as an intranet, internet, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed multi-sensor processing. Alternatively, computer system 200 may include a mainframe or other type of host computer system capable of Web-based communications via network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Computer system 200 may include one or more microphones and/or speakers to facilitate voice and/or audio communications with a user. Server operations personnel may interact with the system 200 for controlling and/or programming the system from remote terminal devices via the network 212.

The computer system 200 may run a variety of application programs and store associated data in a database of mass storage system 208. One or more such applications may include a KWS system and/or an ASR such as described with respect to FIGS. 3 and 4.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as machine learning (ML), deep learning, and artificial intelligence using neural networks. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with the system 300 and/or 400, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 300 and/or 400 includes a networked-based, e.g., Internet-based, application that may be configured and run on the system 200 and/or any combination of the other components of the system 300 and/or 400. The server 112 and/or computer system 200 may include a web server running a Web 2.0 application or the like. Web applications running on systems 300 and/or 400 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain implementations, system 200, 300, and/or 400 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The computer 200, server 122, devices 102, 104, and 106, system 300, system 400, or another components of systems 300 and 400 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 3:
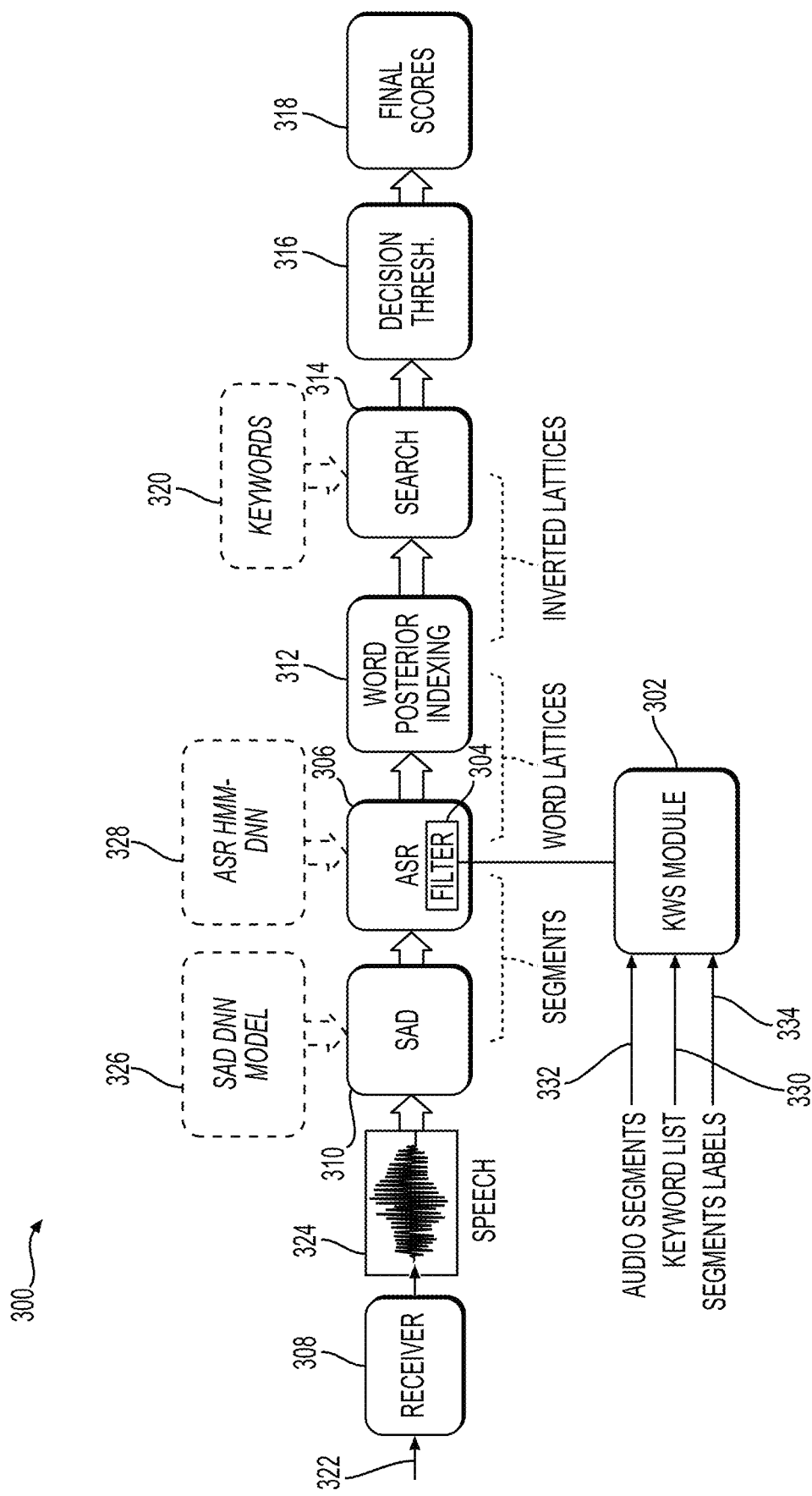
FIG. 3 is a block diagram of an audio keyword search system using fast filtering.

FIG. 3 is a block diagram of an audio keyword search system and/or pipeline 300 using fast filtering. System 300 includes a KWS module 302 including a KWS filter 304. The KWS module 302 including KWS filer 304 may be integrated within ASR 306. Pipeline and/or system 300 includes a receiver 308, a speech activity detector (SAD) and/or voice activity detector (VAD) 310, a word posterior indexing module 312, a search module 314, and a decision threshold function 316 that may output final scores 318 associated with the detection of keywords 320.

In operation, receiver 308 receives a modulated communication signal 322 which may include an electronic signal transmitted via a wireless and/or wireline medium. Receiver 308 de-modulates and/or extracts an audio signal from signal 322 which includes at least one audio segment 324 that is output to SAD 310. In one implementation, SAD 310 uses a deep neural network (DNN) model 326 to detect whether audio segment 324 includes speech. Those segments 324 determined to include speech are passed on and output to ASR 306. In some implementations, ASR 306 uses a Hidden Markov Model deep neural network (HMM-DNN) 328 to recognize the speech within a speech segment such as segment 324.

Each segment 324 may have a duration in the range of 1 second to 10 seconds. In some configurations, each segment may be less than or equal to about 1 second, 5, seconds, 10 seconds, 15 seconds, 20 seconds, and 30 seconds. In one implementation, KWS module 302 uses a HMM-DNN model 328 or another neural network model to define a classification function that is used by KWS filter 304 to filter out and/or omit segments such as segment 324 that do not contain a keyword in keyword list 330. KWS module 302 may receive training audio segments 332, keyword list 330, and segment labels 334 associated with each training audio segment 332. Training segments 332 may include a mix a segments having a keyword in keyword list 330 and segments not having a keyword in keyword list 330. Segment labels 334 may include labels indicating whether each audio segment of audio segments 332 includes a keyword in keyword list 330 or does not include a keyword of keyword list 330.

In some implementations, ASR 306 includes a phoneme and/or word decoder such as, for example, a finite state transducer (FST) decoder configured to form a word and/or phoneme lattice associated with each of the speech segments 324. The formulation and processing associated with performing speech recognition by the decoder can account for a substantial percentage of the processing cost expended by system 300 to perform keyword searching. One reason for this is that the decoder usually must process every segment such as segment 324 even though a substantial portion of the processed audio segments may not include a keyword of keywords 320. By including KWS module 302 and KWS filter 304 in ASR 306 that pre-filters out or omits those audio segments that do not include a keyword of list 330 and/or keywords 320, ASR 306 is able to perform automatic speech recognition substantially more efficiently, more rapidly, and by utilizing substantially less processing power of a device such as devices 102, 104, 106 and server 112.

ASR 306 may then output one or more word lattices from its decoder to word posterior indexing function 312 which may formulate one or more inverted indices to enable searching by search module 314 for keywords 320. To determine whether a keyword of keywords 320 is present within an audio segment such as segment 324, decision threshold function 316 may assign a score 318 related to a probability of the presence of any keywords 320. If the score 318 is determined to be greater than or equal to the threshold value, the pipeline and/or system 300 determines that the audio segment 324 includes a keyword of keywords 320. System 300 may then store audio segment 324 and/or forward audio segment 324 to another system and/or server 120 or 122 for further review or processing.

Figure 4:
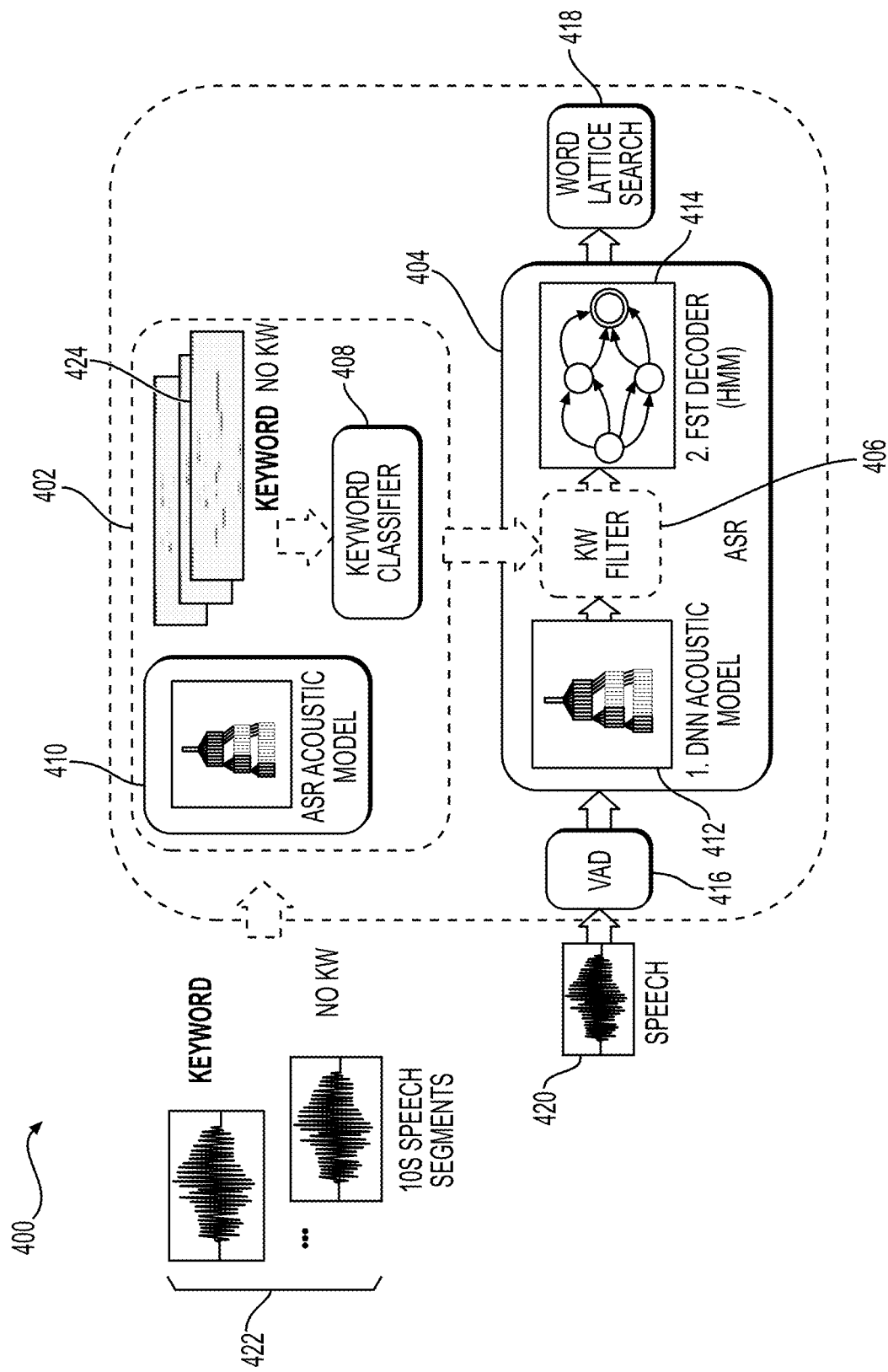
FIG. 4 is a block diagram of a keyword search module and filter.

FIG. 4 is a block diagram of a keyword search system 400 including a KWS learning module 402 integrated with an ASR 404. KWS learning module 402 includes a keyword (KW) filter 406, keyword classifier 408 and an ASR acoustic model 410. FIG. 4 shows KW filter 406 positioned within ASR 404 between DNN acoustic model 412 and decoder 414. In some implementations, KWS learning module 402 or any portion thereof, such as KW filter 406, is integrated within ASR 404. In some implementations, KWS learning module 402 including KW filter 406 is capable of being retrofitted into and/or integrated with an existing ASR 404. System 400 also includes VAD 416 and word lattice search module 418.

In operation, KWS system 400 receives at least one audio segment 420 that is input into VAD 416. VAD 416 may receive segment 420 from a receiver such as receiver 308. In one implementation, VAD 416 uses a deep neural network (DNN) model such as model 326 to detect whether audio segment 420 includes speech. Those segments 420 determined to include speech are passed on and/or output to ASR 404. In some implementations, ASR 404 uses DNN acoustic model 412, which may include a Hidden Markov Model deep neural network (HMM-DNN) such as model 328 to recognize the speech within a speech segment such as segment 420. DNN acoustic model 412 may include other acoustic models such as, without limitation, a recursive DNN. Each segment 420 may have a duration in the range of 1 second to 10 seconds. In some configurations, each segment may be less than or equal to about 1 second, 5, seconds, 10 seconds, 15 seconds, 20 seconds, and 30 seconds. In one implementation, KWS learning module 402 uses ASR acoustic model 410 which may include HMM-DNN model 328 or another neural network model to define a keyword classifier 408.

A first automatic speech recognition engine and/or DNN acoustic model 412 may be arranged to identify one or more phonemes included in voice segment 420 and output the one or more phonemes to KW filter 406. Decoder 414 may be arranged to, if the one or more phonemes are outputted by the KW filter 406, receive the one or more phonemes included in voice segment 402 and generate a word lattice associated with voice segment 420.

KWS learning module 402 may implement a second automatic speech recognition engine such as ASR acoustic model 410 to extract one or more posteriorgram features associated with training speech segments 422. Keyword classifier 408 may execute a machine learning technique to determine a filter function based on a keyword list such as keyword list 330 and one or more posteriorgram features. Keyword classifier 408 may define a single filter function that is used by KW filter 406 to filter out and/or omit segments such as segment 420 that do not contain a keyword such as in keyword list 330 which would be an input into learning module 402. KWS learning module 402 may receive training audio segments 422, a keyword list such as keyword list 330 of FIG. 3, and segment labels 424 associated with each training audio segment 422. Training segments 420 may include a mix a segments having a keyword in keyword list 330 and not having a keyword in keyword list 330. Segment labels 424 may include labels indicating whether each audio segment of audio segments 422 includes a keyword in keyword list 330 or does not include a keyword of keyword list 330. In some implementations, each segment label may identify a specific keyword or keywords included in a particular training audio segment 422.

In some implementations, ASR 406 includes a phoneme and/or word decoder 414 such as, for example, a finite state transducer (FST) decoder configured to form a word and/or phoneme lattice associated with each of the speech segments 420. The formulation and processing associated with performing speech recognition by decoder 414 can account for a substantial percentage of the processing cost expended by system 400 to perform keyword searching. One reason for this is that decoder 414 may otherwise process every segment such as segment 420 even though a substantial portion of the processed audio segments may not include a keyword of keywords 320, which may be used by word lattice search module 418. By including KWS learning module 402 and KW filter 406 in ASR 404 that pre-filters out or omits those audio segments that do not include a keyword or list 330 and/or keywords 320, ASR 404 is able to perform automatic speech recognition substantially more efficiently, more rapidly, and by utilizing substantially less processing power of a device such as devices 102, 104, 106 and server 112.

ASR 404 may then output one or more word lattices from its decoder 418 and perform a word search using word lattice search module 418 to determine whether an audio segment such as segment 420 includes a target keyword such as in keyword list 320 and 330. Keyword list 330 may be the same as keyword list 320. In some implementations, keyword list 320 may include a subset of keywords in keyword list 330. Word lattice search module 418 may perform one or more of the operations of search module 314 and decision threshold function 316 to determine a score associated with each audio segment 420 such as score 318. System 400 may store audio segment 420 and/or forward audio segment 420 to another system and/or server 120 or 122 for further review or processing. In some implementations, word lattice search module 418 includes a word lattice search engine arranged to: i) receive the word lattice associated with voice segment 420 if generated by decoder 414, ii) search the word lattice for one or more keywords in a keyword list such as keywords 320, and iii) determine whether voice segment 420 includes one or more of the keywords 320.

Figure 5:
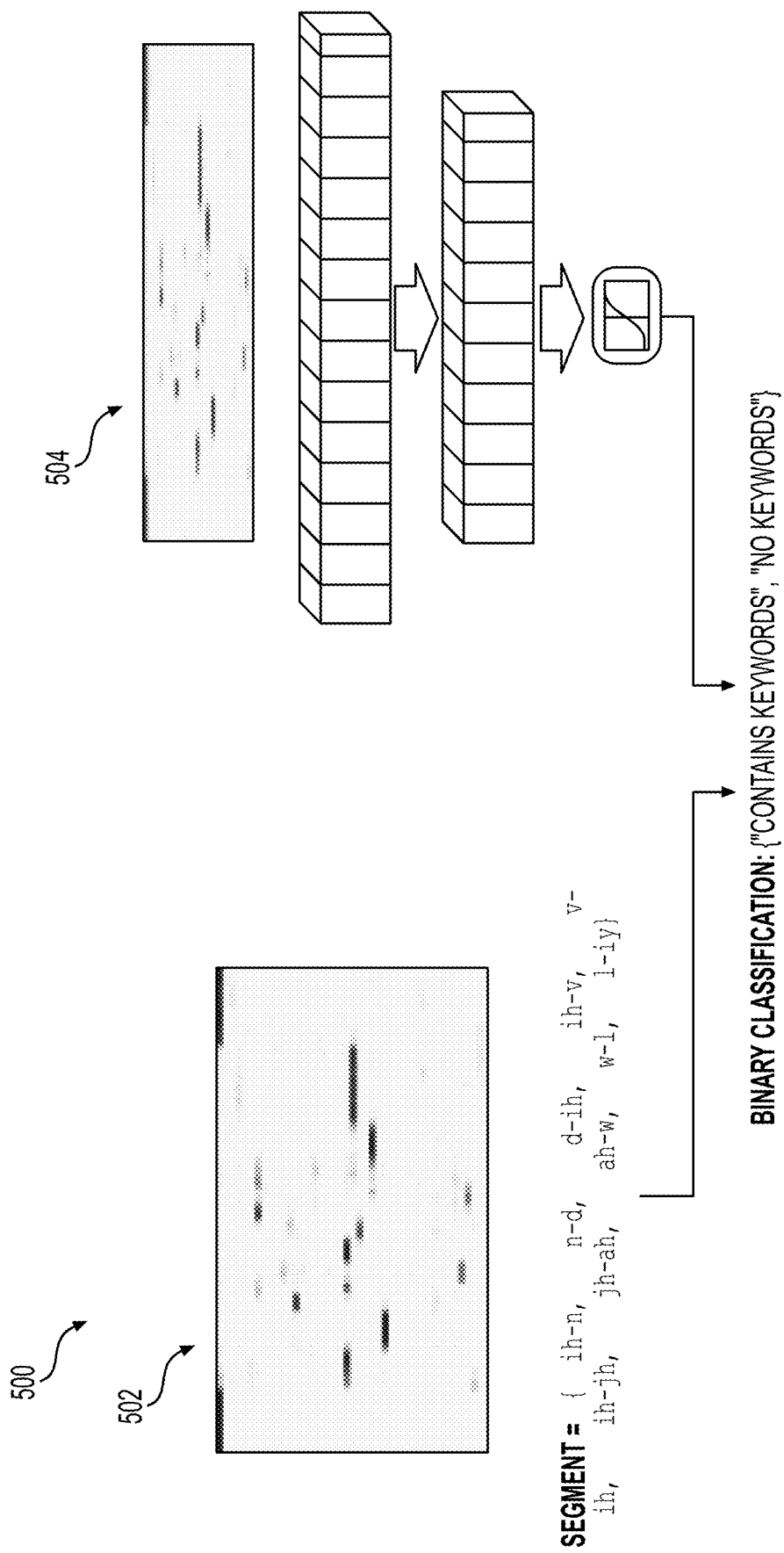
FIG. 5 shows two categories of keyword classifiers.

FIG. 5 shows diagram 500 including two categories of keyword filter classifiers 502 and 504. Keyword filter classifier 502 includes a bag of phoneme or phone N-grams technique. The bag of phone N-grams classifier 502 may apply an approach of collapsing frame outputs associated with a voice segment such as segment 324 or 420 and then estimating phone N-gram counts as a sparse feature vector representation of a voice segment such as segment 324 or 420. This enables the bag of phone N-grams classifier 502 to make a binary (yes/no) determination of whether a voice segment such as segment 324 or 420 contains a keyword in, for example, keyword list 330, or does not contain a keyword in keyword list 330. Keyword filter classifier 504 includes a direct classification technique. The direct classification classifier 504 may apply feed poster probabilities of an acoustic model output such as from ASR acoustic model 410 directly to deep networks. This enables the direct classification classifier 504 to make a binary (yes/no) determination of whether a voice segment such as segment 324 or 420 contains a keyword in, for example, keyword list 330, or does not contain a keyword in keyword list 330.

Figure 6:
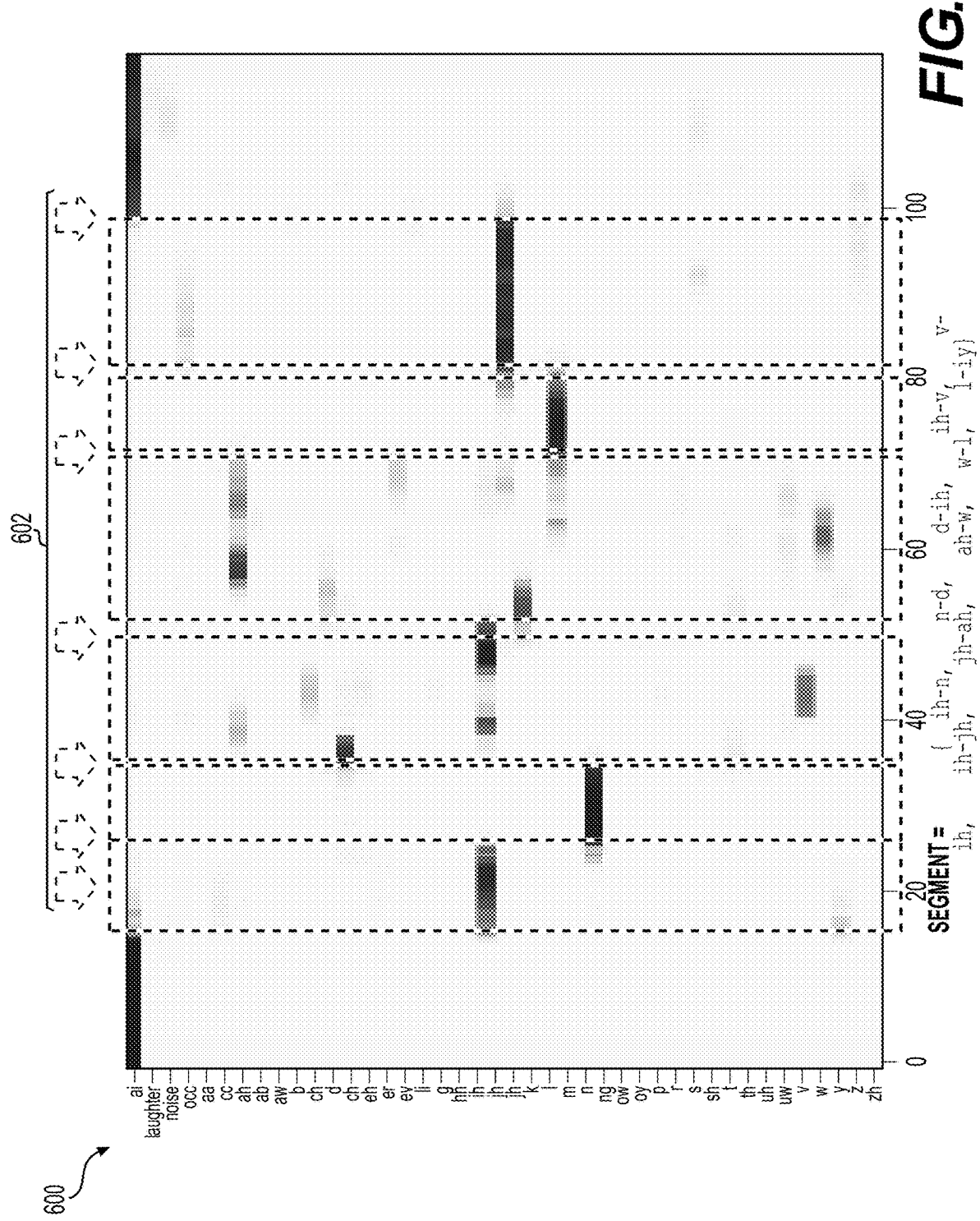
FIG. 6 shows a keyword classifier technique based on estimating N-gram counts from posteriorgrams.

FIG. 6 shows a graph 600 of a posteriorgram based on the spoken term "individually" that illustrates how the bag of phone N-grams classifier 502 may make a yes/no determination based on estimating N-gram counts from a posteriorgram by detecting change points 602 in the distribution of phones using a sliding two frame block. Classifier 502 may record a change point when the root mean square error (RMSE) between normalized phone distributions in adjacent blocks exceeds a set threshold. The counts are then normalized to a sum of 1 in each bin defined by the change points 602. Classifier 504 then computes overlapping 2-gram soft counts from the bins. As a baseline classifier, weighted soft counts are computed using inverse document frequency (IDF) from training scripts and/or training segments. Classifier 504 may then compute the cosine similarity between the keywords such as in keyword list 330 and N-grams of a segment such as segment 324 or 420 to make a binary determination whether a keyword of list 330 is present in an audio segment such as segment 324 or 420. An ASR engine such as ASR acoustic model 410 may implement other bag of N-gram classifiers including Naïve Bayes (NB) N-gram classifiers of various types such as Naïve Bayes with restricted vocabulary (NB-KW) where feature vectors are limited to N-grams; Naïve Bayes with full vocabulary using all N-grams (NB-All) in training; and Naïve Bayes with minimum classification error (NB-MCE) having per-N-gram discriminately trained weights using misclassification measure M(S).

Figure 7:
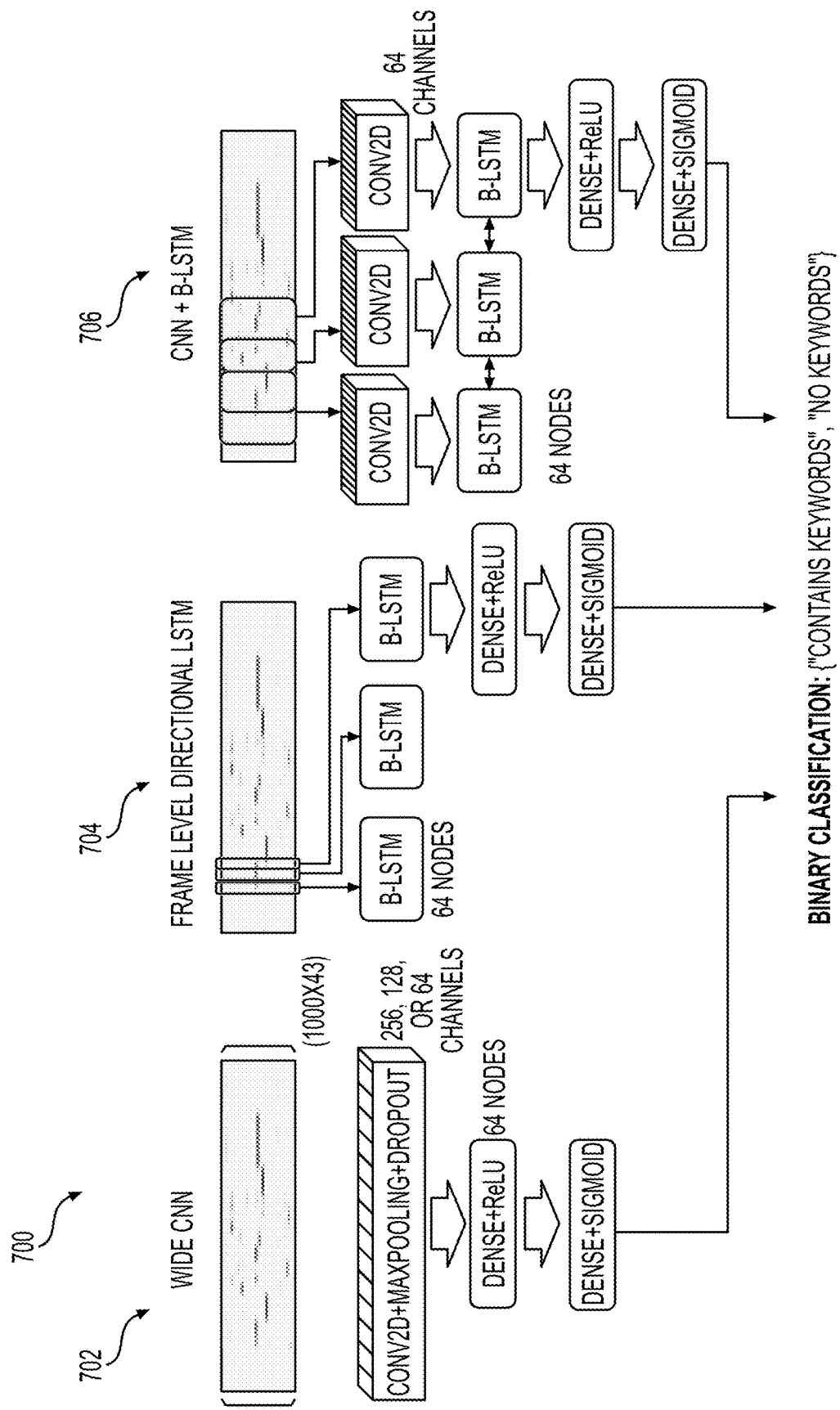
FIG. 7 shows various keyword classifier techniques based on deep learning.

FIG. 7 shows a diagram 700 of various direct classification techniques based on deep learning that may be implemented by, for example, learning module 402 using an ASR engine such as ASR acoustic model 410. The techniques of FIG. 7 may include a wide convolutional neural network (Wide CNN) classifier 702, a frame level bidirectional long short term memory (LSTM) classifier 704, and a CNN with bidirectional LSTM (CNN+B-LSTM) classifier 706. These classifiers enable a binary (yes/no) determination of whether a voice segment such as segment 324 or 420 contains a keyword in, for example, keyword list 330, or does not contain a keyword in keyword list 330. In some implementations, the Conv2D block of Wide CNN classifier 702 and/or CNN+B-LSTM classifier 706 is repeated 1, 2, or 3 times, or more. In some implementations, Wide CNN classifier 702 and/or CNN+B-LSTM classifier 706 uses a Conv2D block with MaxPool and Dropout with 20 ms input windows.

Figure 8A:
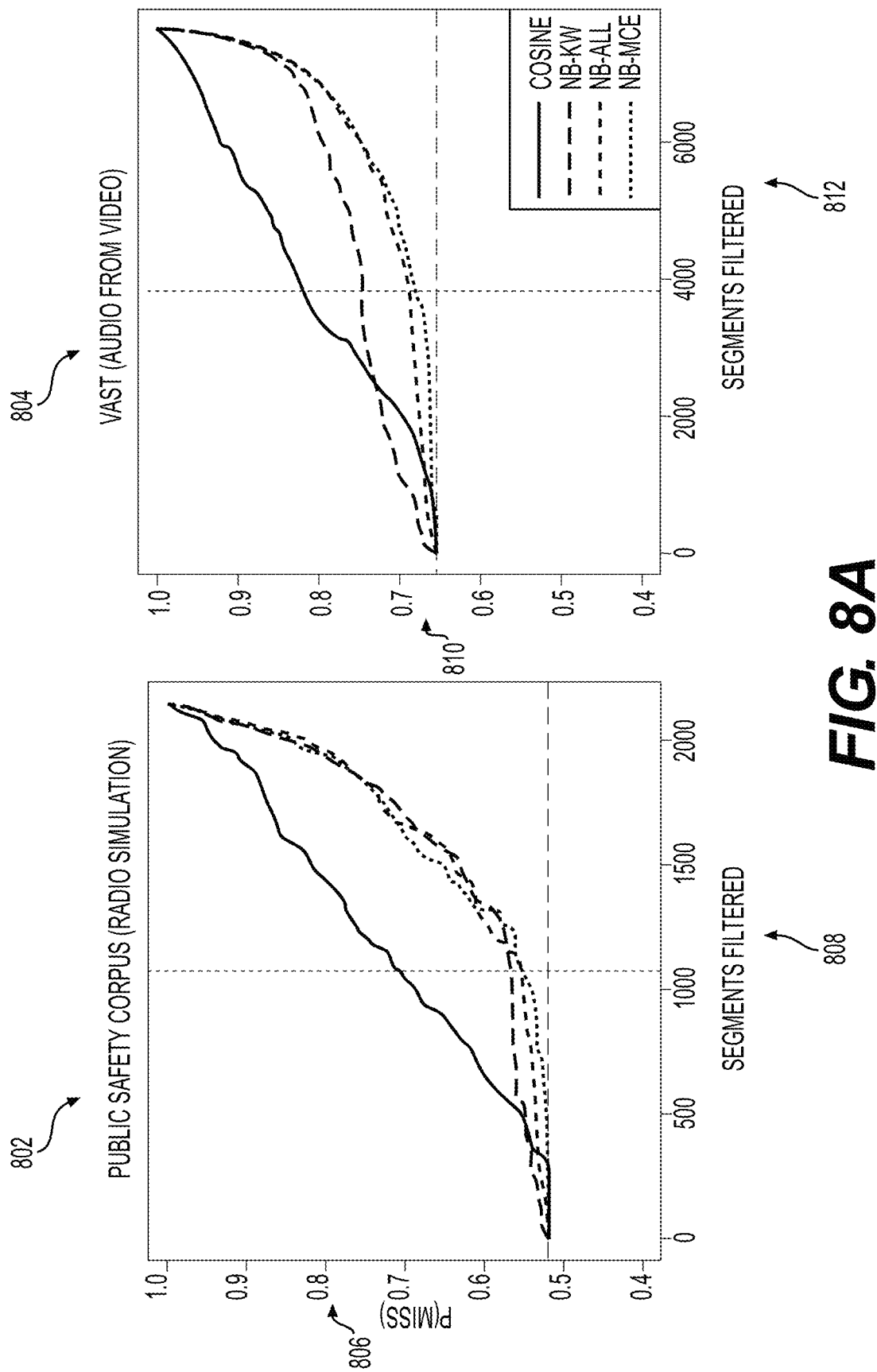
FIG. 8A shows graphs of miss rate versus the number of segments using bag of N-grams classifiers for PSC and VAST data.

FIG. 8A shows graphs 802 and 804 of miss rate 806 and 810 versus the number of segments 808 and 812 respectively using bag of N-grams classifiers such as Consine, NB-KW, NB-All, and NB-MCE for PSC and video analytic speech technology (VAST) data. Graphs 802 and 804 illustrate that at a 50% removal rate of segments, the miss rate is only increased by about 3-5% using light weight classifiers including bag of N-gram classifiers with respect to conventional KWS systems.

Figure 8B:
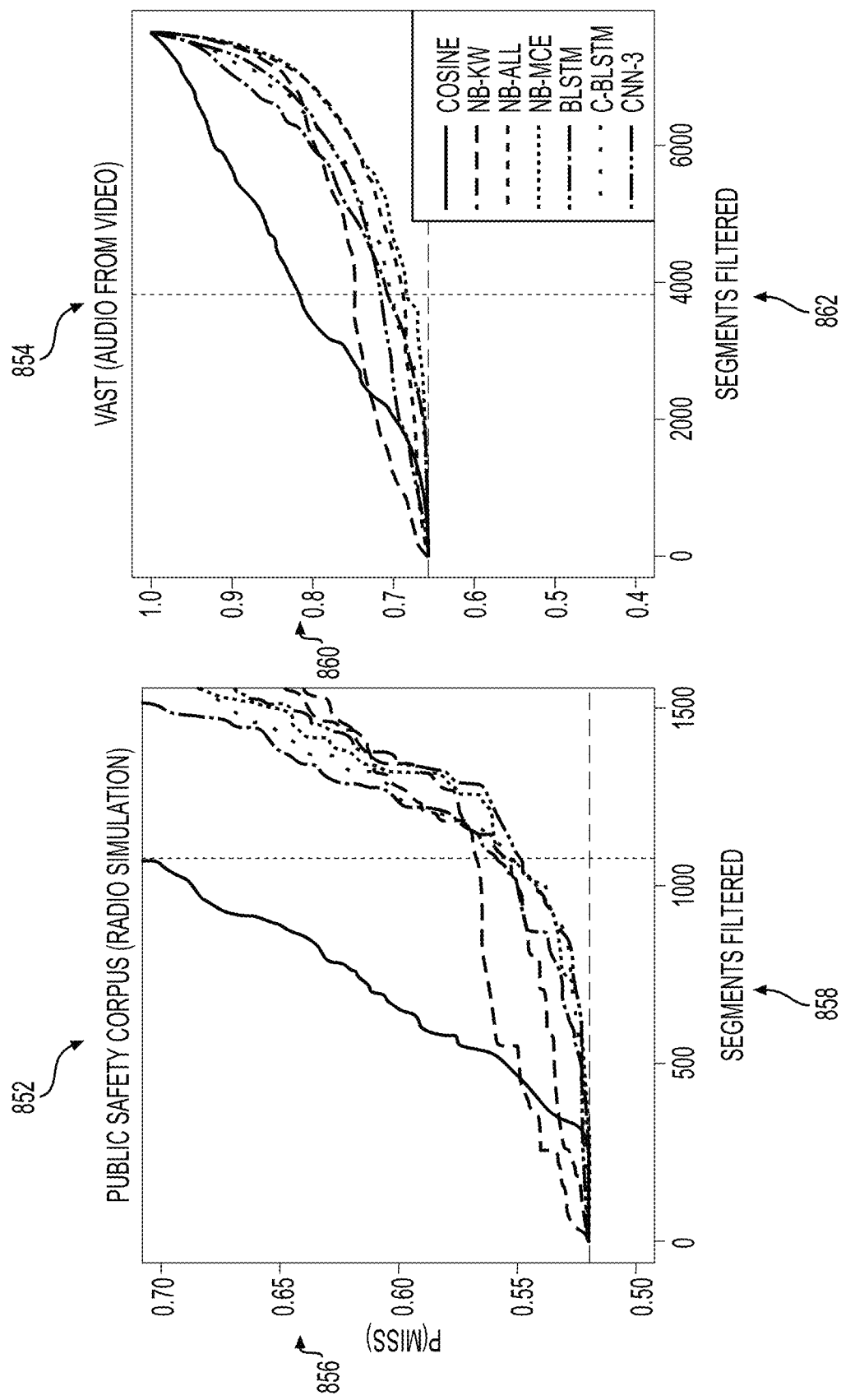
FIG. 8B shows graphs of miss rate versus the number of segments using deep learning classifiers for PSC and VAST data.

FIG. 8B shows graphs 852 and 854 of miss rate 856 and 860 versus the number of segments 856 and 862 respectively using deep learning classifiers such as Cosine, NB-KW, NB-All, NB-MCE, BLSTM, C-BLSTM, and CNNO3 for PSC and VAST data. Graphs 852 and 854 illustrate that direct classification methods can be as effective on PSC data as lightweight classifiers. Direct classifiers may also benefit from more PSC training data versus the VAST data.

Figure 9:
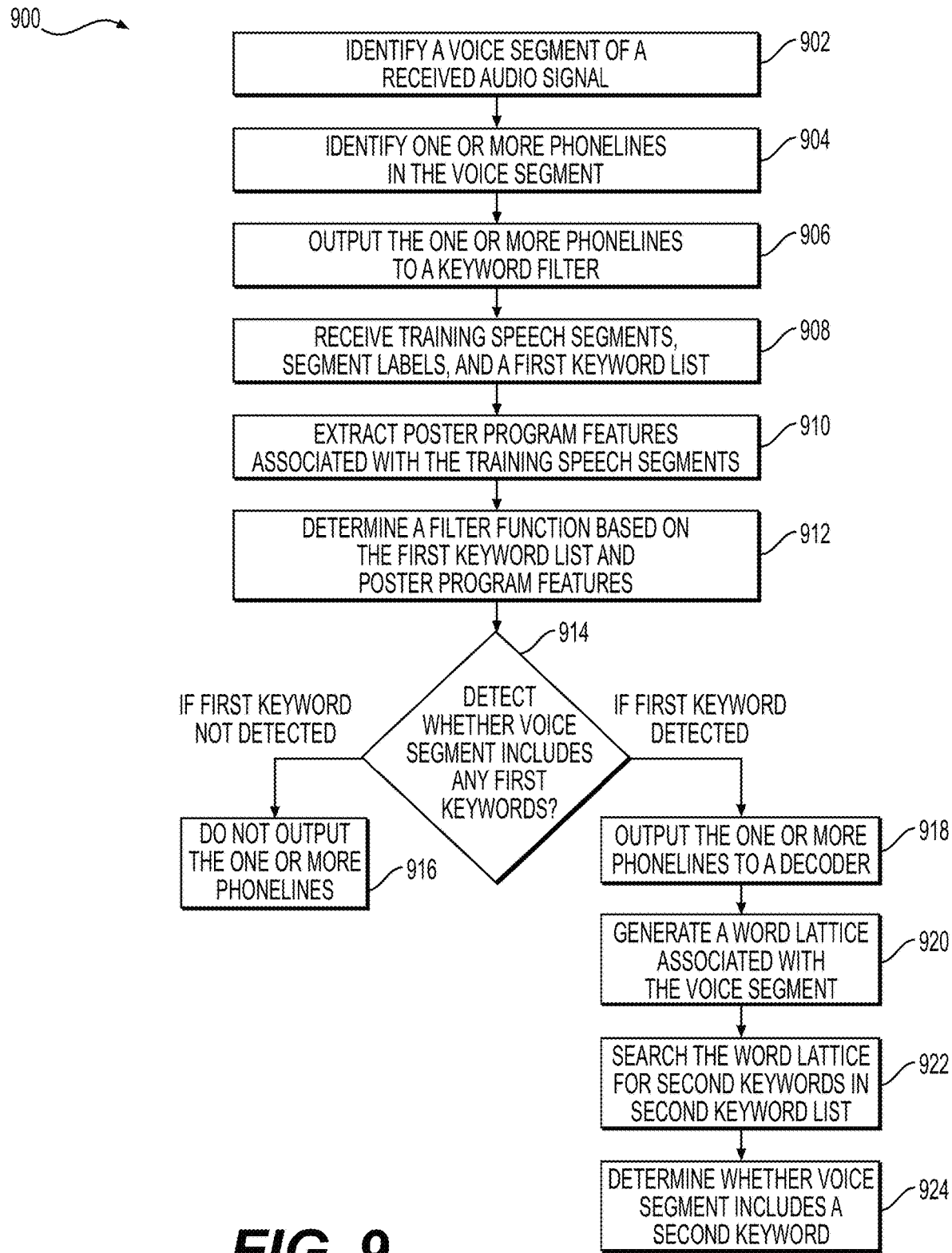
FIG. 9 shows an exemplary process for performing a fast keyword search.

FIG. 9 shows an exemplary process 900 for performing a fast keyword search. Exemplary keyword search process 900 includes the following steps; identify a voice segment of a received audio signal (Step 902); identify, by a first automatic speech recognition engine such as DNN acoustic model 412, one or more phonemes included in the voice segment such as voice segment 324 or 420 (Step 904); output, from the first automatic speech recognition engine, the one or more phonemes to a keyword filter such as filter 304 or 406 (Step 906); receive a plurality of training speech segments such as segments 332 or 422, segment labels associated with the plurality of training speech segments such as labels 334 or 424, and a first keyword list including one or more first keywords such as keyword list 330 (Step 908); extract, by a second automatic speech recognition engine such as ASR acoustic model 410, one or more posteriorgram features associated with the plurality of training speech segments 332 or 422 (Step 910); determine, by a machine learning technique, a filter function based on the first keyword list such as list 330 and the one or more posteriorgram features (Step 912); execute the filter function to detect whether the voice segment such as segment 324 or 420 includes any of the one or more first keywords of the first keyword list such as list 330 and, if detected, outputting the one or more phonemes included in the voice segment to a decoder such as decoder 414 but, if not detected, not outputting the one or more phonemes included in the voice segment 324 or 420 to a decoder such as decoder 414 (Step 914); If the one or more phonemes is not detected, do not output the one or more phonemes to decoder 414 (Step 916); If the one or more phonemes in the voice segment 324 or 420 are detected, output the one or more phonemes to a decoder such as decoder 414 (Step 918); generate, by the decoder, a word lattice associated with the voice segment (Step 920); search the word lattice for one or more second keywords 320 in a second keyword list (Step 922); and determine whether the voice segment 324 or 420 includes the one or more second keywords 320 (Step 924).

It will be apparent to those of ordinary skill in the art that certain aspects involved in the operation of the system 300 or system 400, server 112, and other devices such as devices 102, 104, and 106 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. An audio keyword search system comprising:
   a voice activity detector arranged to identify a voice segment of a received audio signal;
   an automatic speech recognizer including:
      a first automatic speech recognition engine arranged to identify one or more phonemes included in the voice segment and output the one or more phonemes to a keyword filter; and
      a decoder arranged to, if the one or more phonemes are outputted by the keyword filter, receive the one or more phonemes included in the voice segment and generate a word lattice associated with the voice segment;
   a keyword search module including:
      a learning module arranged to: i) receive a plurality of training speech segments, ii) receive segment labels associated with the plurality of training speech segments, iii) receive a first keyword list including one or more first keywords, and iv) execute a second automatic speech recognition engine to extract one or more posteriorgram features associated with the plurality of training speech segments;
      a keyword classifier arranged to execute a machine learning technique to determine a filter function based on the first keyword list and the one or more posteriorgram features, wherein the filter function enables a binary determination of whether the voice segment includes any of the one or more first keywords of the first keyword list, and wherein the filter function collapses frame outputs associated with the voice segment and then estimates phone N-gram counts as a sparse feature vector representation of the voice segment enabling the filter function to make the binary determination; and
      the keyword filter arranged to execute the filter function to detect whether the voice segment includes any of the one or more first keywords of the first keyword list using the sparse vector representation of the voice segment and, if detected, output the one or more phonemes included in the voice segment to the decoder but, if not detected, not output the one or more phonemes included in the voice segment to the decoder; and
   a word lattice search engine arranged to: i) receive the word lattice associated with the voice segment if generated by the decoder, ii) search the word lattice for one or more second keywords in a second keyword list, and iii) determine whether the voice segment includes the one or more second keywords.

2. The system of claim 1, wherein the machine learning technique includes one of a bag of phone N-grams technique and a direct classification technique.

3. The system of claim 2, wherein the bag of phone N-grams technique includes a cosine similarity classification technique.

4. The system of claim 2, wherein the direct classification technique includes a Naïve Bayes classification technique.

5. The system of claim 1, wherein the filter function includes one or more filter parameters learned from the machine learning technique.

6. The system of claim 1, wherein a portion of the one or more first keywords of the first keyword list includes the one or more second keywords of the second keyword list.

7. The system of claim 1, wherein the first automatic search recognition engine is the same as the second automatic search recognition engine.

8. The system of claim 7, wherein the first automatic search recognition engine includes a deep neural network acoustic model.

9. The system of claim 1, wherein the decoder includes a finite state transducer (FST) decoder.

10. The system of claim 9, wherein the decoder implements a Hidden Markov Model (HMM).

11. A method for performing an audio keyword search comprising:
   identifying a voice segment of a received audio signal;
   identifying, by a first automatic speech recognition engine, one or more phonemes included in the voice segment;
   outputting, from the first automatic speech recognition engine, the one or more phonemes to a keyword filter;
   receiving a plurality of training speech segments, segment labels associated with the plurality of training speech segments, and a first keyword list including one or more first keywords;
   extracting, by a second automatic speech recognition engine, one or more posteriorgram features associated with the plurality of training speech segments;
   determining, by a machine learning technique, a filter function based on the first keyword list and the one or more posteriorgram features, wherein the filter function enables a binary determination of whether the voice segment includes any of the one or more first keywords of the first keyword list; and wherein the filter function collapses frame outputs associated with the voice segment and then estimates phone N-gram counts as a sparse feature vector representation of the voice segment enabling the filter function to make the binary determination;
   executing the filter function to detect whether the voice segment includes any of the one or more first keywords of the first keyword list using the sparse vector representation of the voice segment and, if detected, outputting the one or more phonemes included in the voice segment to a decoder but, if not detected, not outputting the one or more phonemes included in the voice segment to the decoder; and
   if the one or more phonemes in the voice segment are output to the decoder:
      generating, by the decoder, a word lattice associated with the voice segment;
      searching the word lattice for one or more second keywords in a second keyword list, and
      determining whether the voice segment includes the one or more second keywords.

12. The method of claim 11, wherein the machine learning technique includes one of a bag of phone N-grams technique and a direct classification technique.

13. The method of claim 12, wherein the bag of phone N-grams technique includes a cosine similarity classification technique.

14. The method of claim 12, wherein the direct classification technique includes a Naïve Bayes classification technique.

15. The method of claim 1, wherein the filter function includes one or more filter parameters learned from the machine learning technique.

16. The method of claim 11, wherein a portion of the one or more first keywords of the first keyword list includes the one or more second keywords of the second keyword list.

17. The method of claim 11, wherein the first automatic search recognition engine is the same as the second automatic search recognition engine.

18. The method of claim 17, wherein the first automatic search recognition engine includes a deep neural network acoustic model.

19. The method of claim 11, wherein the decoder includes a finite state transducer (FST) decoder.

20. A mobile computing device comprising:
- a receiver arranged to receive a communications signal and extract from the communications signal a received audio signal;
- a voice activity detector arranged to identify a voice segment of the received audio signal;
- an automatic speech recognizer including:
  - a first automatic speech recognition engine arranged to identify one or more phonemes included in the voice segment and output the one or more phonemes to a keyword filter; and
  - a decoder arranged to, if the one or more phonemes are outputted by the keyword filter, receive the one or more phonemes included in the voice segment and generate a word lattice associated with the voice segment;
- a keyword search module including:
  - a learning module arranged to: i) receive a plurality of training speech segments, ii) receive segment labels associated with the plurality of training speech segments, iii) receive a first keyword list including one or more first keywords, and iv) execute a second automatic speech recognition engine to extract one or more posteriorgram features associated with the plurality of training speech segments;
  - a keyword classifier arranged to execute a machine learning technique to determine a filter function based on the first keyword list and the one or more posteriorgram features, wherein the filter function enables a binary determination of whether the voice segment includes any of the one or more first keywords of the first keyword list; and wherein the filter function collapses frame outputs associated with the voice segment and then estimates phone N-grain counts as a sparse feature vector representation of the voice segment enabling the filter function to make the binary determination; and
- the keyword filter arranged to execute the filter function to detect whether the voice segment includes any of the one or more first keywords of the first keyword list using the sparse vector representation of the voice segment and, if detected, output the one or more phonemes included in the voice segment to the decoder but, if not detected, not output the one or more phonemes included in the voice segment to the decoder; and
- a word lattice search engine arranged to: i) receive the word lattice associated with the voice segment if outputted by the decoder, ii) search the word lattice for one or more second keywords in a second keyword list, and iii) determine whether the voice segment includes the one or more second keywords.

\* \* \* \* \*

UNITED STATES PATENT AND TRADEMARK OFFICE
CERTIFICATE OF CORRECTION

| | | |
|---|---|---|
| PATENT NO. | : 12,020,697 B2 | Page 1 of 1 |
| APPLICATION NO. | : 16/929383 | |
| DATED | : June 25, 2024 | |
| INVENTOR(S) | : Jonathan C. Wintrode | |

It is certified that error appears in the above-identified patent and that said Letters Patent is hereby corrected as shown below:

In the Claims

In Column 14, Line 43, in Claim 11, after "and", insert a linebreak

In Column 15, Line 7, in Claim 15, delete "claim 1," and insert --claim 11,-- therefor In Column 16, Line 15, in Claim 20, after "and", insert a linebreak In Column 16, Line 17, in Claim 20, delete "N-grain" and insert --N-gram-- therefor Signed and Sealed this
Thirtieth Day of September, 2025

John A. Squires
*Director of the United States Patent and Trademark Office*